US008953601B2

(12) United States Patent
Kaippallimalil et al.

(10) Patent No.: US 8,953,601 B2
(45) Date of Patent: Feb. 10, 2015

(54) INTERNET PROTOCOL VERSION SIX (IPV6) ADDRESSING AND PACKET FILTERING IN BROADBAND NETWORKS

(75) Inventors: John Kaippallimalil, Richardson, TX (US); Yangsong Xia, Nanjing (CN)

(73) Assignee: Futurewei Technologies, Inc., Plano, TX (US)

( * ) Notice: Subject to any disclaimer, the term of this patent is extended or adjusted under 35 U.S.C. 154(b) by 428 days.

(21) Appl. No.: 12/415,740

(22) Filed: Mar. 31, 2009

(65) Prior Publication Data

US 2009/0285215 A1    Nov. 19, 2009

Related U.S. Application Data

(60) Provisional application No. 61/052,931, filed on May 13, 2008, provisional application No. 61/082,717, filed on Jul. 22, 2008.

(51) Int. Cl.
*H04L 12/56* (2006.01)
*H04L 29/12* (2006.01)
*H04L 29/06* (2006.01)

(52) U.S. Cl.
CPC ........... *H04L 29/12933* (2013.01); *H04L 63/08* (2013.01); *H04L 61/103* (2013.01); *H04L 61/6068* (2013.01); *H04L 61/6059* (2013.01); *H04L 29/12028* (2013.01); *H04L 29/12915* (2013.01); *H04L 61/2015* (2013.01)
USPC ........................................................ 370/392

(58) Field of Classification Search
None
See application file for complete search history.

(56) References Cited

U.S. PATENT DOCUMENTS

| 6,151,679 | A  | * | 11/2000 | Friedman et al. ............. 726/3 |
| 6,539,225 | B1 | * | 3/2003 | Lee ............................... 455/436 |
| 7,752,653 | B1 | * | 7/2010 | Droms et al. ................. 726/3 |
| 2004/0179539 | A1 | * | 9/2004 | Takeda et al. ................ 370/401 |
| 2005/0232228 | A1 | * | 10/2005 | Dharanikota et al. ........ 370/351 |
| 2006/0036733 | A1 | * | 2/2006 | Fujimoto et al. ............. 709/225 |
| 2006/0159100 | A1 | * | 7/2006 | Droms et al. ................. 370/395.2 |
| 2006/0184692 | A1 | * | 8/2006 | Ikeda ............................ 709/245 |
| 2006/0200561 | A1 | * | 9/2006 | Tsuhara et al. .............. 709/226 |
| 2006/0221921 | A1 | * | 10/2006 | Kniveton ...................... 370/338 |
| 2006/0262725 | A1 |  | 11/2006 | Barrett |
| 2007/0022211 | A1 |  | 1/2007 | Shimizu et al. |
| 2007/0064695 | A1 | * | 3/2007 | Song et al. .................... 370/390 |
| 2007/0115981 | A1 |  | 5/2007 | Jreij et al. |

OTHER PUBLICATIONS

Juniper Networks, "Configuring Multicast Listener Discovery", May 26, 2007, Sections: Overview + MLD Proxy Overview.*

(Continued)

*Primary Examiner* — Steve Young
(74) *Attorney, Agent, or Firm* — Conley Rose, P.C.; Grant Rodolph; Brandt D. Howell

(57) ABSTRACT

A method comprising sending a dynamic host configuration protocol (DHCP) message comprising an Identity Association for Prefix Delegation (IA_PD) Prefix option comprising a Internet Protocol version 6 (IPv6) prefix and a length of the IPv6 prefix to a device having a media access control (MAC) address, receiving from the device a packet comprising a source MAC address and a source IPv6 address, and dropping the packet when the MAC address is equal to the source MAC address and the leftmost bits of the source IPv6 address defined by the length are not equal to the IPv6 prefix.

16 Claims, 10 Drawing Sheets

(56) References Cited

OTHER PUBLICATIONS

Asadullah, S., et al., "ISP IPv6 Deployment Scenarios in Broadband Access Networks," Network Working Group, RFC 4779, Jan. 2007, 82 pages.
Bradner, S., "Key Words for Use in RFCs to Indicate Requirement Levels," Network Working Group, RFC 2119, Mar. 1997, 3 pages.
Crawford, M., "Transmission of IPv6 Packets Over Ethernet Networks," Network Working Group, RFC 2464, Dec. 1998, 8 pages.
Deering, S., "Internet Protocol, Version 6 (IPv6)," Network Working Group, RFC 2460, Dec. 1998, 37 pages.
Droms, R., et al., "Dynamic Host Configuration Protocol for IPv6 (DHCPv6)," Network Working Group, RFC 3315, Jul. 2003, 95 pages.
Hinden, R., et al., "IP Version 6 Addressing Architecture," Network Working Group, RFC 4291, Feb. 2006, 24 pages.
Lind, M., et al., "Scenarios and Analysis for Introducing IPv6 Into ISP Networks," Network Working Group, RFC 4029, Mar. 2005, 27 pages.
McCann, J., et al., "Path MTU Discovery for IP Version 6," Network Working Group, RFC 1981, Aug. 1996, 16 pages.
Melsen, T., "MAC-Forced Forwarding: A Method for Subscriber Separation on an Ethernet Access Network," Network Working Group, RFC 4562, Jun. 2006, 14 pages.
Miyakawa, S., et al., "Requirements for IPv6 Prefix Delegation," Network Working Group, RFC 3769, Jun. 2004, 6 pages.
Narten, T., et al., "Neighbor Discovery for IP Version 6 (IPv6)," Network Working Group, RFC 4861, Sep. 2007, 91 pages.
Nikander, P., et al., "IPv6 Neighbor Discovery (ND) Trust Models and Threats," Network Working Group, RFC 3756, May 2004, 22 pages.
Patil, B., et al., "Transmission of IPv6 via the IPv6 Convergence Sublayer over IEEE 802.16 Networks," Network Working Group, RFC 5121, Feb. 2008, 21 pages.
Shirasaki, Y., et al., "A Model of IPv6/IPv4 Dual Stack Internet Access Service," Network Working Group, RFC 4241, Dec. 2005, 10 pages.
Thomson, S., et al., "IPv6 Stateless Address Autoconfiguration," Network Working Group, RFC 4862, Sep. 2007, 28 pages.
Troan, O., et al., "IPv6 Prefix Options for Dynamic Host Configuration Protocol (DHCP) Version 6," Network Working Group, RFC 3633, Dec. 2003, 18 pages.
Vida, R., et al., "Multicast Listener Discovery Version 2 (MLDv2) for IPv6," Network Working Group, RFC 3810, Jun. 2004, 58 pages.
Wasserman, M., "Recommendations for IPv6 in Third Generation Partnership Project (3GPP) Standards," Network Working Group, RFC 3314, Sep. 2002, 24 pages.
Technical Report, DSL Forum TR-101, "Migration to Ethernet-Based DSL Aggregation," Architecture and Transport Working Group, Apr. 2006, 101 pages.
DSL Forum, Working Text, WT-146, Draft Version 2.4, "Subscriber Sessions," Architecture and Transport Working Group, May 3, 2007, 28 pages.
DSL Forum, TR-144, "Broadband Multi-Service Architecture & Framework Requirements," Aug. 2007, 62 pages.
DSL Forum, WT-177, Draft, "Migration to IPv6 in the Context of TR-101," May 2008, 22 pages.
Foreign Communication From a Related Counterpart Application—International Search Report and Written Opinion, PCT/CN2009/071773, Aug. 13, 2009, 11 pages.
Cheshire, "IPv4 Address Conflict Detection," RFC 4227, Jul. 2008.

\* cited by examiner

INTERNET PROTOCOL VERSION SIX (IPV6) ADDRESSING AND PACKET FILTERING IN BROADBAND NETWORKS

CROSS-REFERENCE TO RELATED APPLICATIONS

The present application claims priority to U.S. Provisional Patent Application No. 61/052,931 filed May 13, 2008 by John Kaippallimalil et al. and entitled "Method and System for IPv6 Addressing and Packet Filtering in Broadband Networks" and U.S. Provisional Patent Application No. 61/082,717 filed Jul. 22, 2008 by John Kaippallimalil et al. and entitled "Method and System for IPv6 Addressing and Packet Filtering in Broadband Networks," both of which are incorporated herein by reference as if reproduced in their entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Internet Protocol (IP) version six (IPv6) is being introduced for various access technologies such as Digital Subscriber Line (DSL), Fiber to the Home (FTTH) over Ethernet based on the Institute of Electrical and Electronics Engineers (IEEE) 802.3 standard, Wi-Fi based on IEEE 802.11 standard, and WiMAX based on IEEE 802.16 standard. For example, in the TR-144 architecture for "Broadband Multiservice Architecture & Framework Requirements" of the DSL Forum, which is incorporated herein by reference as if reproduced in its entirety, IPv6 support is being introduced in addition to Internet Protocol version four (IPv4) support. Specifically, the TR-144 requirements discuss the need for network interconnection standards for broadband access, Quality of Service (QoS) support, and Bandwidth on demand, increased overall bandwidth and higher network reliability and availability. The requirements also include support for a broader range of market segments including both business and residential markets, wholesale and retail, and better user experience. However, specific mechanisms for IPv6 deployment to meet such technology requirements have not yet been developed.

SUMMARY

In one embodiment, the disclosure includes a method comprising sending a dynamic host configuration protocol (DHCP) message comprising an Identity Association for Prefix Delegation (IA_PD) Prefix option comprising a IPv6 prefix and a length of the IPv6 prefix to a device having a media access control (MAC) address, receiving from the device a packet comprising a source MAC address and a source IPv6 address, and dropping the packet when the MAC address is equal to the source MAC address and the leftmost bits of the source IPv6 address defined by the length are not equal to the IPv6 prefix.

In another embodiment, the disclosure includes an apparatus comprising at least one processor configured to implement a method comprising receiving a first multicast listener report message for a solicited-node multicast address, forwarding the first multicast listener report message to an IP Edge device, receiving a second multicast listener report message for a global scope multicast address, and proxying the second multicast listener report message.

In yet another embodiment, the disclosure includes a node configured to implement a method comprising inspecting a DHCP message comprising an IA_PD Prefix option for an IPv6 prefix and a length of the IPv6 prefix, mapping the IPv6 prefix to a MAC address of a device receiving the IPv6 prefix, and populating a table using the mapping.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are systems and methods for IPv6 deployment in access networks, which may be based on DSL technology. The IPv6 systems comprise access network router models, such as a routed RG model and a bridged RG model, which may be employed in the DSL architecture. Additionally, the IPv6 systems comprise IPv6 prefix link models, such as a shared IPv6 prefix link model and a point-to-point IPv6 prefix link model. The IPv6 deployment methods comprise IPv6 address configuration and prefix delegation for a RG and a host connected to the RG. The IPv6 deployment methods also comprise building IPv6 filtering states at an IP edge and IPv6 packet filtering at an access node (AN). Additionally, the IPv6 deployment methods comprise router discovery and multicast listener discovery at the AN.

Figure 1:
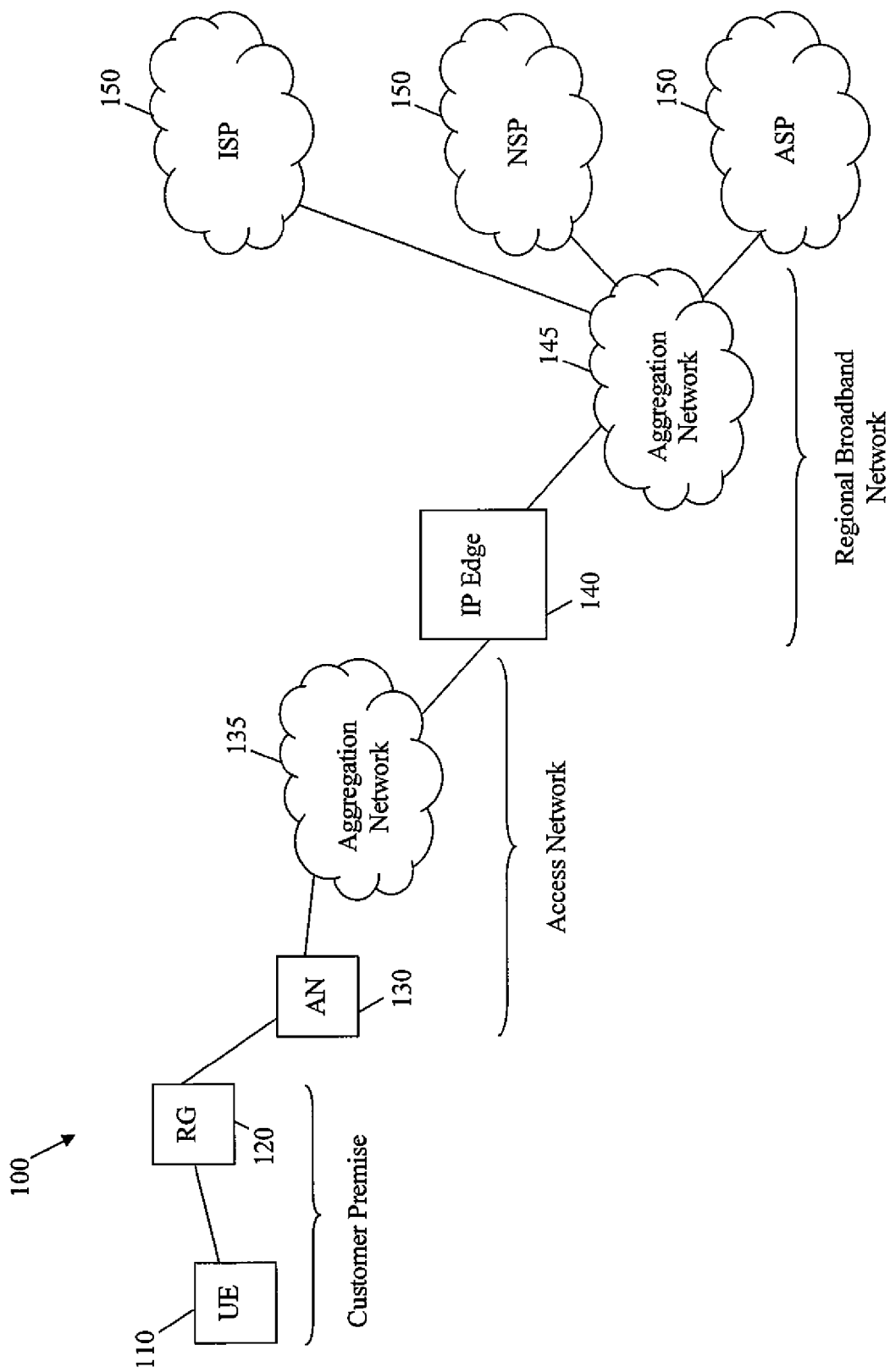
FIG. 1 is a schematic diagram of an embodiment of an access network system.

FIG. 1 illustrates an embodiment of an access network system 100, which may be based on DSL technology. The access network system 100 may comprise at least one UE 110, a RG 120, an AN 130, and an IP edge 140. The UE 110 may be coupled to the RG 120, for instance at a customer premise or a local network. The AN 130 may be located at an access network and may be coupled to the RG 120. The AN 130 may also be coupled to a first aggregation network 135, such as an IP network. The IP edge 140 may be located at a regional broadband network and may be coupled to the AN 130, for instance via the first aggregation network 135. The IP edge 140 may also be coupled to a second aggregation network 145, such as another IP network. Additionally, the access network system 100 may comprise at least one service provider 150, such as an Internet service provider (ISP), a network service provider (NSP), an application service provider (ASP), or combinations thereof, which may be coupled to the IP edge 140, for instance via the second aggregation network 145.

The UE 110 may be any device capable of transmitting or receiving signals to and from the RG 120, such as electrical or optical signal. In one embodiment, the UE 110 may create, send, or receive the signals using a fixed link, such as a wired cable or a fiber optic cable, between the UE 110 and the RG 120. The fixed link may implement Ethernet, Asynchronous Transfer Mode (ATM), IP, or any other suitable protocol. The UE 110 may be a fixed device, including a personal computer (PC) such as a desktop computer, a telephone such as a voice over IP (VoIP) telephone, or a set top box. Alternatively, the UE 110 may be a portable device, such a laptop computer, or a cordless phone, which may use the fixed link to communicate with the RG 120. In another embodiment, the UE 110 may be any user mobile device, component, or apparatus that communicates with the RG 120 using a wireless link. For example, the UE 110 may be a mobile phone, a personal digital assistant (PDA), a portable computer, or any other wireless device. As such, the UE 110 may comprise an infrared port, a Bluetooth interface, an IEEE 802.11 compliant wireless interface, or any other wireless communication system that enables the UE 110 to communicate wirelessly with the RG 120. Accordingly, the wireless link may be an IEEE 802.11 link, a Wi-Fi link, a Bluetooth link, a Worldwide Interoperability for Microwave Access (WiMAX) link, a near field communication (NFC) link, an Infrared Data Association (IrDa) link, or any other communication link established using wireless technology.

The RG 120 may be any device, component, or network configured to allow the UE 110 to gain access to the access network associated with the AN 130. For instance, the RG 120 may be configured to establish a wireless or fixed link with the UE 110 and forward communications between the UE 110 and the AN 130. For example, the RG 120 may be an IP router, such as a customer premises equipment (CPE) router or any router equipment located at a subscriber's premises and that communicates with the access network. Alternatively, the RG 120 may be a DSL modem, a cable modem, or a set-top box. In yet another embodiment, the RG 120 may be a node that forwards IPv4 and/or IPv6 packets to and from the UE 110. Further, the RG 120 may be a routed RG, which may establish authentication with the access network and allow a trusted UE 110 to communicate with the access network. Alternatively, the RG 120 may be a bridged RG that forwards packets between the IP edge 140 and the UE 110, which may establish authentication directly with the IP edge 140.

The AN 130 may be any device that transports communications between the RG 120 and the IP edge 140, for instance via the first aggregation network 135. For example, the AN 130 may be a switch, a router, or a bridge, such as a Provider Edge Bridge (PEB) or a Provider Core Bridge (PCB). The AN 130 may be coupled to the RG 120 and the IP Edge 140 via fixed links, such as Ethernet or IP links. In some embodiments, the AN 130 may also support packet replication for multicast applications. As such, the AN 130 may receive the packets from the regional broadband network via the IP edge 140 and forward a plurality of copies of the packets to a plurality of RGs 120 at a plurality of local networks.

The IP edge 140 may be any device that forwards packets between the AN 130 and the service provider 150, for instance via the first aggregation network 135 and the second aggregation network 145. The packets may be forwarded between the AN 130 and the service provider 150 using fixed links. For example, the IP edge 140 may be a Broadband Routed Access Server (BRAS) or a DSL Access Multiplexer (DSLAM) as defined by the Broadband Forum. Alternatively, the IP edge 140 may be a Cable Modem Termination Server (CMTS). In other embodiments, the IP edge 140 may comprise bridges, switches, routers, or combinations thereof. For instance, the IP edge 140 may comprise a Backbone Edge Bridge (BEB), a PEB, a PCB, or a user network interfaces (UNI). In some embodiments, the IP Edge 140 may be a point-oriented wire-line node, such as a DSL connection or a provider network edge device.

The IP edge 140 may provide a plurality of network access services to the UE 110 at the customer premise. For instance, the IP edge 140 may exchange authentication information with the access network using the IEEE 802.1X protocol and with an authentication server, such as an authentication, authorization, and accounting (AAA) server to authenticate the UE 110 or the RG 120. The authentication information may be exchanged using a remote authentication protocol, such as a RADIUS protocol or a DIAMETER protocol. Further, the IP edge 140 may provide QoS requirements for downstream communications with the UE 110. In some embodiments, the access network system 100 may comprise a plurality of IP edges 140, which may be coupled to the AN 130 and provide a plurality of network access services. For example, a second IP edge 140 may be coupled to the access network of the AN 130 and provide multicast IP Television (TV) services, which may be streamed down to the UE 110.

Figure 2:
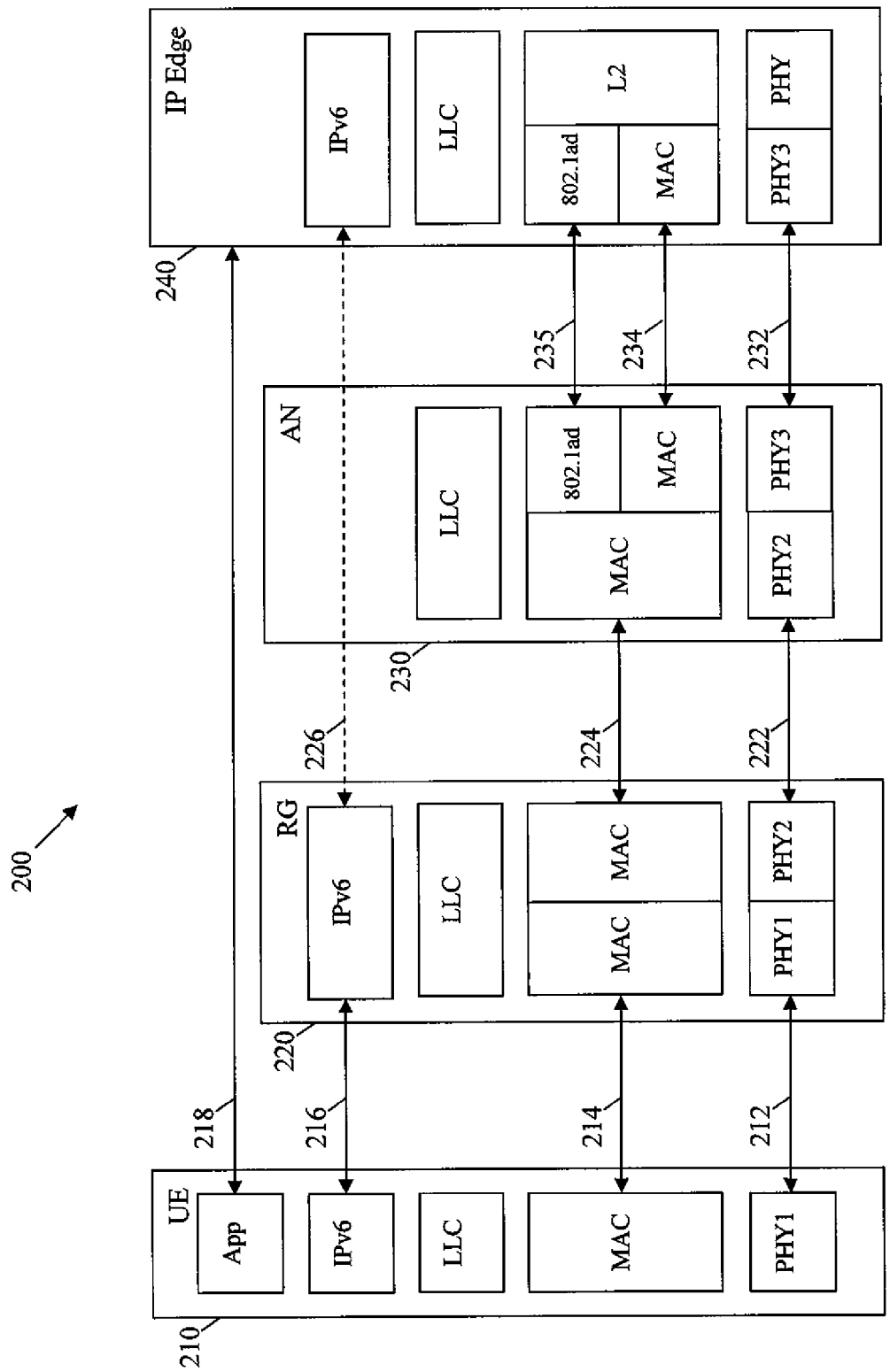
FIG. 2 is a schematic diagram of an embodiment of a routed residential gateway (RG) architecture.

FIG. 2 illustrates an embodiment of a routed RG architecture 200, which may be used to establish authentication with the access network and provide access to a trusted UE. The routed RG architecture 200 may comprise a UE 210, a RG 220, an AN 230, and an IP edge 240, which may be configured substantially similar to the corresponding components of the access network system 100. Specifically, the RG 220 may establish a physical connection with the UE 210, for instance using a first physical layer (Phy1) link 212 and a first media access control (MAC) link 214. The RG 220 and the AN 230 may also establish a physical connection, for instance using a second physical layer (Phy2) link 222 and a second media access control (MAC) link 224. Additionally, the AN 230 may establish a physical connection with the IP edge 240, for instance using a third physical layer (Phy3) link 232, a third MAC link 234, and an IEEE 802.1ad link 235.

In an embodiment, the RG 220 may authenticate with the IP edge 240 and allow the trusted UE 210 to communicate with the IP edge 240 and access a service provider or an external network. For instance, the RG 220 may establish a trusted connection with the UE 210 using a first IPv6 link 216 and authenticate with the IP edge 240 using a second IPv6 link 226. Hence, the UE 210 may communicate with the IP edge 240, for example using an application layer link 218. Further, the AN 230 may use the second IPv6 link 226 to snoop and maintain a filtering state to block or limit the packet flow to the RG 220, as described in further detail below. In an embodiment, the UE 210 and the AN 230 may communicate using an Ethernet link, a C-tagged virtual local area network (VLAN), or a priority tagged VLAN. The AN 230 and the IP edge 240 may communicate using an S-tagged VLAN via an aggregation network, for instance based on the DSL Forum TR-101 specifications.

Figure 3:
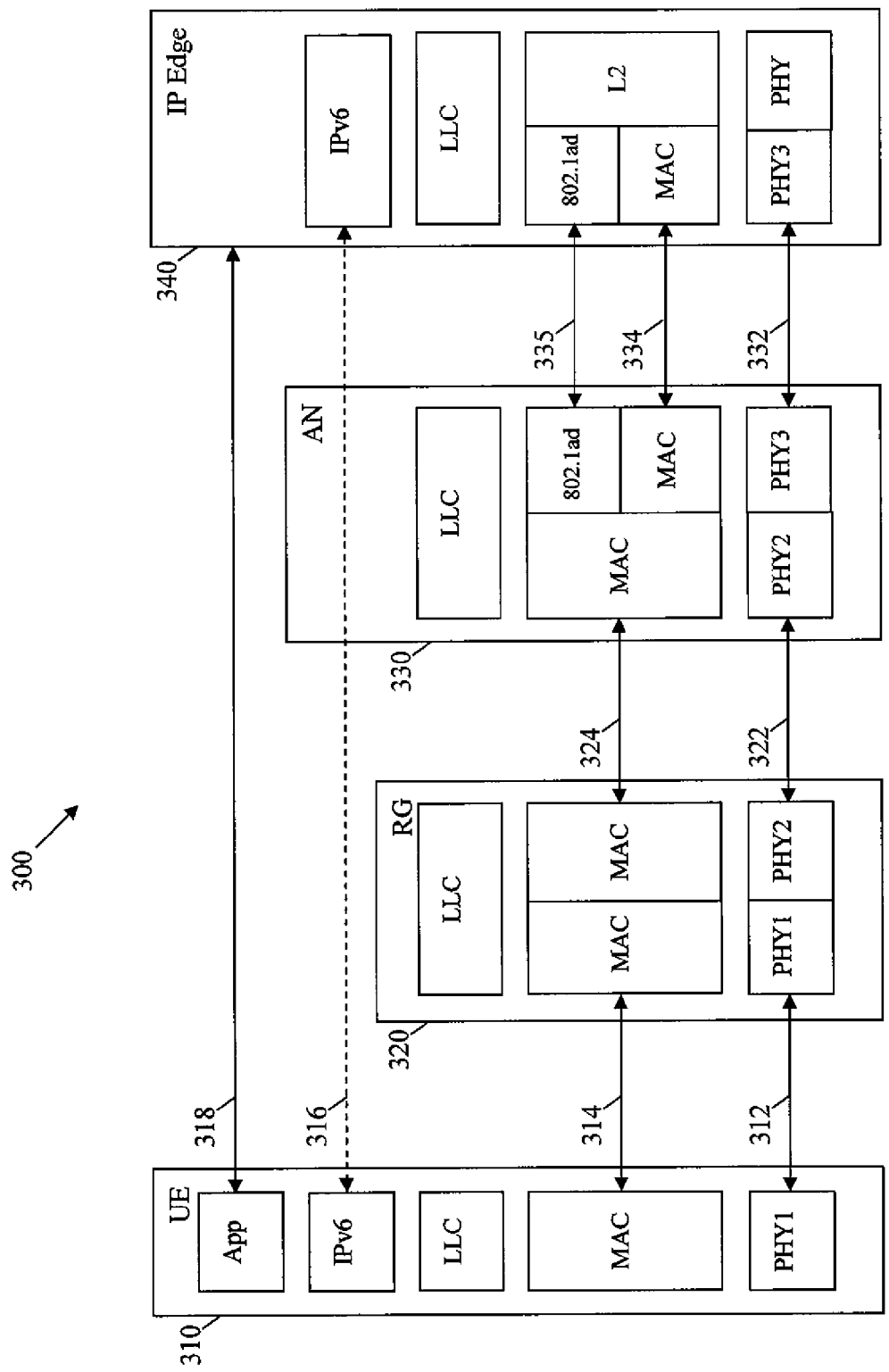
FIG. 3 is a schematic diagram of an embodiment of a bridged RG architecture.

FIG. 3 illustrates an embodiment of a bridged RG architecture 300, where a UE may establish direct authentication with an IP edge. The bridged RG architecture 300 may comprise a UE 310, a RG 320, an AN 330, and an IP edge 340, which may be configured substantially similar to the corresponding components of the access network system 100. In an embodiment, the RG 320 may establish a physical connection with the UE 310 using a Phy1 link 312 and a first media access control (MAC) link 314. The RG 320 and the AN 330 may also establish a physical connection using a Phy2 link 322 and a second media access control (MAC) link 324. Further, the AN 330 may establish a physical connection with the IP edge 340 using a Phy3 link 332, a third MAC link 334, and an IEEE 802.1ad link 335.

In an embodiment, the UE 310 may directly authenticate with the IP edge 340, via their connection with the RG 320 and the AN 330. Accordingly, the RG 320 and the AN 330 may be layer 2 (L2) bridges that forward data between the UE 310 and the IP edge 340 without substantially participating in the authentication process of the UE 310. For instance, the UE 310 may authenticate with the IP edge 340 and establish a trusted connection using an IPv6 link 316 that may extend between the UE 310 and the IP edge 340. Hence, the UE 310 may communicate with the IP edge 340, for example using a link 318 at the application layer. The AN 330 may also snoop and maintain a filtering state using the second IPv6 link 316 between the UE 310 and the IP edge 340. In an embodiment, the UE 310 and the AN 330 may communicate using an Ethernet link, a C-tagged VLAN, or a priority tagged VLAN. The AN 330 and the IP edge 340 may communicate using an S-tagged VLAN, for example via an aggregation network. In an embodiment, the bridged RG architecture 300 may be used for transmitting downstream a plurality of unicast packets assigned to a plurality of UEs.

In an embodiment, the first IPv6 link 216 and the second IPv6 link 226 of the routed RG architecture 200 as well as the IPv6 link 316 of the bridged RG architecture 300 may conform to Internet Engineering Task Force (IETF) Request for Comments (RFC) 4861 entitled "Neighbor Discovery for IP Version 6 (IPv6)," by T. Narten et al., which is incorporated herein by reference as if reproduced in its entirety. For instance, the IPv6 links may be any communication facility or medium over which the network components, e.g., UE, RG, AN, or IP edge, can communicate over the link layer, e.g., the layer immediately below the IP layer. Specifically, in the bridged RG architecture, one IPv6 link may be used for each UE, while in the routed RG architecture two IPv6 links may be used for each UE. Further, in the case of a DSL network, IPv4 deployment requirements include high assignment efficiency and network separation of attached hosts. However, the high assignment efficiency requirement may be relaxed in the case of IPv6 deployment for DSL networks, since IPv6 may provide a substantially larger address space than IPv4. The network separation of attached hosts requirement may be met by using a plurality of separate IPv6 links for a plurality of UEs or for a plurality of interfaces, such as ports, at the same UE.

Additionally, the UEs or interfaces may use a point-to-point IPv6 prefix link model or a shared IPv6 prefix link model to communicate with an external network via the IP edge. For instance, using the point-to-point IPv6 prefix link model, a unique prefix, such as a network address prefix, may be assigned over each separate link for each UE or interface. On the other hand, using the shared IPv6 prefix link model, the UEs or interfaces may share a prefix over a shared link, which may facilitate communications between the UEs at a local network.

Figure 4:
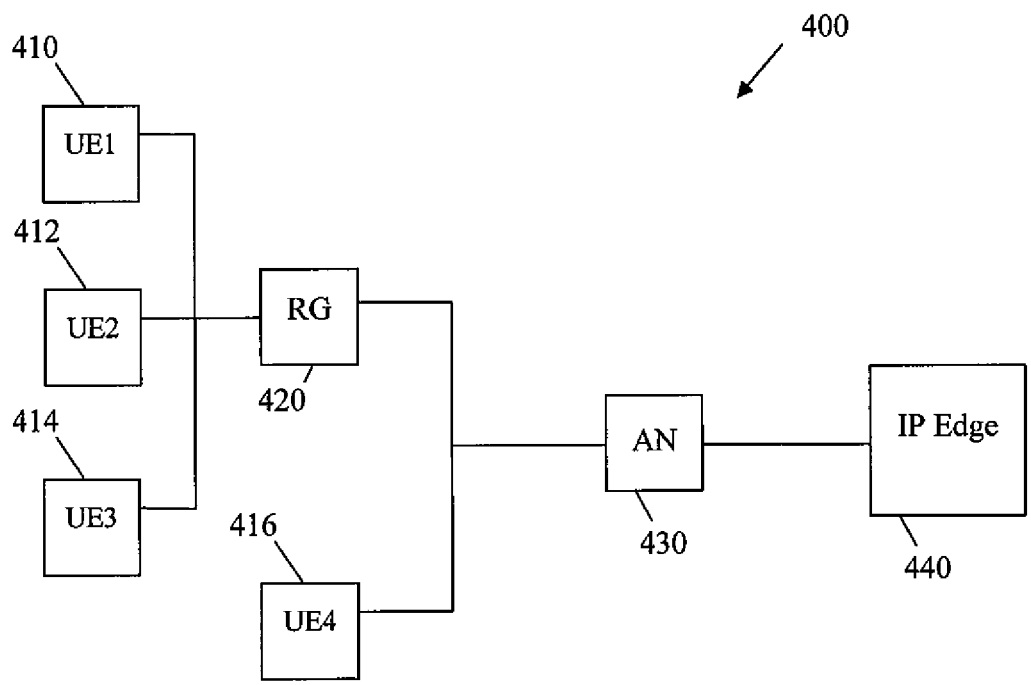
FIG. 4 is a schematic diagram of an embodiment of a shared IPv6 prefix link model.

FIG. 4 illustrates an embodiment of a shared IPv6 prefix link model 400, which may be used to provide the UE access to an external or access network. The shared IPv6 prefix link model 400 may comprise a first UE (UE1) 410, a second UE (UE2) 412, a third UE (UE3) 414, a fourth UE (UE4) 416, a RG 420, an AN 430, and an IP edge 440. The UE1 410, UE2 412, and UE3 414 may share the same prefix, which may be used to generate their IP addresses. As such, the UE1 410, UE2 412, and UE3 414 may share the same IPv6 link with the RG 420, which may be established as described in detail below. However, the UE1 410, UE2 412, and UE3 414 may be connected to the RG 420 using separate physical links, such as L2 links. Further, the RG 420 and the UE4 416 may share a second IPv6 prefix over an IPv6 link with the IP edge 440.

In an embodiment, the RG 420 may be a router, for instance based on the routed RG architecture 200, which may obtain a plurality of prefixes delegated by the IP edge 440, for example using stateless or stateful address configuration based on IETF RFC 3633 entitled "IPv6 Prefix Options for Dynamic Host Configuration Protocol (DHCP) version 6," by O. Troan et al., which is incorporated herein by reference as if reproduced in its entirety. The RG 420 may receive the advertised prefixes and assign the IPv6 prefixes to the UEs. In a specific embodiment, the RG 420 may obtain and/or receive the IPv6 prefixes using an Identity Association for Prefix Delegation (IA_PD) option, which is a construct used to manage the group of IPv6 prefixes delegated by the IP Edge 440 to the RG 420 and is described further in RFC 3633. The RG 420 may also obtain other configuration information with the advertised prefixes, for instance using DHCP options, such as IA_PD Prefix Option/OPTION_IAPREFIX (26) defined in RFC 3633.

It may be difficult to provide on-link multicast support for the UEs using the shared IPv6 prefix link model 400 since some of the network components may be connected using a plurality of physical links and share the same prefix over different links. Instead, the packets may be routed at the IP edge 440 and the RG 420 and forwarded over the shared links. The shared IPv6 prefix link model 400 may be suitable for providing on-link shared services, for example between home network components, e.g., a PC, a printer, a fax, etc. However, the shared IPv6 prefix link model 400 may not be suitable for public access networks, where some additional mechanisms may be needed to maintain separated access between different UEs.

Figure 5:
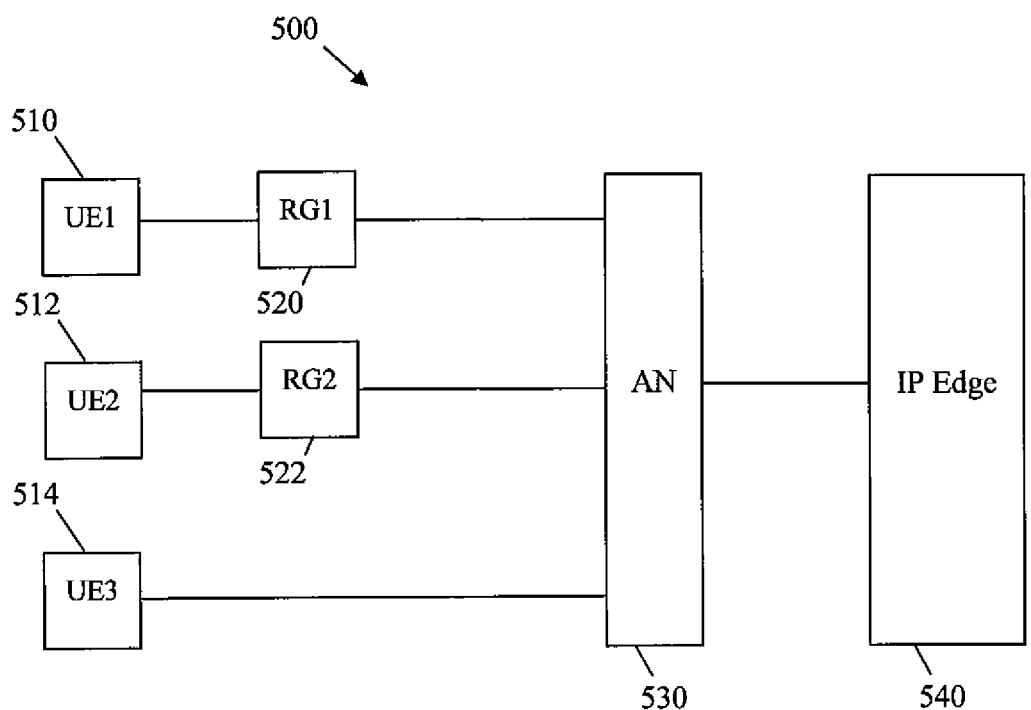
FIG. 5 is a schematic diagram of an embodiment of a point-to-point IPv6 prefix link model.

FIG. 5 illustrates an embodiment of a point-to-point IPv6 prefix link model 500. The point-to-point IPv6 prefix link model 500 may comprise a first UE (UE1) 510, a second UE (UE2) 512, a third UE (UE3) 514, a first RG (RG1) 520, a second RG (RG2) 522, an AN 530, and an IP edge 540. Each of the UE1 510, UE2 512, and UE3 514 may be assigned a unique prefix over a corresponding separate IPv6 link. Accordingly, each of the UE1 510, UE2 512, and UE3 514 may exchange packets using a separate connection, such as a separate Ethernet link based on IEEE 802.1ad. In an embodiment, the UE1 510 may receive its assigned prefix from the RG1 520, which may be a routed RG. For instance, the UE1 510 may be a trusted host at a home network, such as a TV or PC, which may be connected to the RG1 520. For example, the UE1 510 may be connected to a trusted port at the RG1 520. On the other hand, the UE2 512 may receive its assigned prefix directly from the IP edge 540 via the RG2 522, which may be a bridged RG. For instance, the UE2 512 may be an untrusted host, e.g., that connects to an untrusted port at the RG2 522. The UE3 514 may also receive its assigned prefix from the IP edge 540 without connecting to an RG. For instance, the UE3 514 may be a host connected via a network, such as a WiMAX based network, to the AN 530 and the IP edge 540.

In an embodiment, the AN 530 may support packet replication for multicast applications in a DSL network. Accordingly, the AN 530 may forward multicast packets downstream, e.g., from the IP edge 540 to the UE1 510 and UE2 512. However, on-link multicast may not be supported since the links between the UEs and the IP edge 540 are point-to-point links. Instead, the RG1 520 and RG2 522 may forward link-local unicast and multicast packets upstream, e.g., from the UE1 510 and UE2 512 to the IP edge 540.

The prefix assigned to the UE or RG may be similar to a modified 64-bit extended unique identifier (EUI-64) format interface identifier, for instance as specified in RFC 4291 entitled "IP Version 6 Addressing Architecture," by R. Hinden et al., which is incorporated herein by reference as if reproduced in its entirety. The modified EUI-64 format interface identifier may have a length equal to about 64 bits. The modified EUI-64 format interface identifier may be generated using a unique MAC address assigned to the UE or RG and may be used in stateless address configuration. The MAC address may have a length equal to about 48 bits.

In an embodiment, a routed RG may configure its link-local address on its upstream interface and obtain an aggregated prefix to each host, such as a UE connected to it. For instance, the aggregated prefix may be obtained based on RFC 3633. Accordingly, the routed RG may be addressed using a sub-router anycast address corresponding to the allocated prefix. In another embodiment, the RG may derive its link-local interface address using a neighbor discovery mechanism based on RFC 4861. As such, the IP edge may advertise a prefix in a router advertisement message. However, the RG may not be required to accept the advertised prefix. Instead, the RG may obtain an aggregated prefix, for instance using a DHCP mechanism based on RFC 3633.

The UE may configure its link-local address and then its global address using stateless or stateful address configuration, for instance based on an indication in a router advertisement from the IP edge or the routed RG. Further, duplicate address detection (DAD) may be used based on RFC 4861 and RFC 4862 for "IPv6 Stateless Address Autoconfiguration," by S. Thomson, which is incorporated herein by reference as if reproduced in its entirety. In the case of point-to-point links, the addresses may only comprise the host and router interfaces. Thus, the chance of duplicate addresses may be relatively low and tolerated, which may not require using the DAD. However, for shared links, the DAD may be needed to detect any duplicate addresses. The stateless address configuration may also be established based on RFC 4861 and RFC 4862. Accordingly, the IP edge or routed RG may indicate using a router advertisement message that the UE is expected to use the stateless address configuration. Alternatively, the stateful address configuration may be established based on RFC 4861 and RFC 3315 for "Dynamic Host Configuration Protocol for IPv6 (DHCPv6)," by R. Droms, et al., which is incorporated herein by reference as if reproduced in its entirety. Accordingly, the IP edge or routed RG may indicate using a router advertisement message that the UE is expected to use the stateful address configuration.

Figure 6:
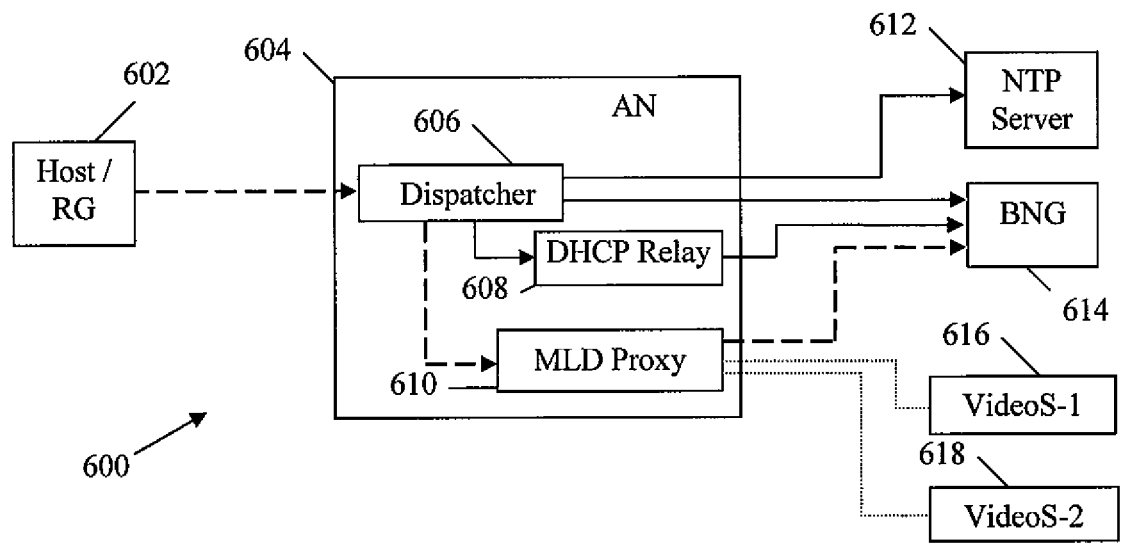
FIG. 6 is a schematic diagram of an embodiment of network capable of implementing multicast listener discovery (MLD).

FIG. 6 depicts an embodiment of a network 600 configured to implement MLD. MLD is described in RFC 3810, entitled "Multicast Listener Discovery Version 2 (MLDv2) for IPv6," by Vida et al., which is incorporated herein by reference as if reproduced in its entirety. The network 600 may comprise a host/RG 602, an AN 604, a network time protocol (NTP) server 612, a broadband network gateway (BNG) 614, a VideoS-1 616, and a VideoS-2 618. The host/RG 602, AN 604, and BNG 614 may be similar to the RG, AN, and IP Edge described above. The NTP server 612 may allow the host/RG 602 to obtain time, while the VideoS-1 616 and the VideoS-2 618 may be video servers from which the host/RG 602 may obtain video content. The AN 604 may comprise three functional modules: a Dispatcher 606, a DHCP Relay 608, and an MLD Proxy 610. The Dispatcher 606 may be a multicast message dispatcher that routes packets to various servers or the MLD proxy 610 based on the multicast transport address in the IPv6 destination address field. The DHCP Relay 608 may relay messages to the BNG 614. The MLD Proxy 610 may forward multicast packets based on MLD membership information. The MLD Proxy 610 may learn and proxy group membership information, as well as forward the IP multicast packets based on the membership information.

In an IPv6 network, the Dispatcher 606 may route messages based on the destination address in IPv6 message header. For example, a message with the destination address FF0E::101 may be routed to the NTP server 612, a message with the destination address FF02:1:2 may be routed to the DHCP Relay 608 and then onto a corresponding DHCP relay in the BNG 614, and a message with the destination address FF02::16 may be routed to the MLD proxy 610. In such a case, the MLD proxy 610 may look at the MLD message to see which servers the host/RG 602 is interested in (e.g. VideoS-1 616 and/or VideoS-2 618), as indicated by the dotted lines. In embodiments, the MLD proxy 610 may use a routing protocol between itself and VideoS-1 616 and/or VideoS-2 618. Thus, the aforementioned behavior may be similar to IPv4.

However, the behavior is different when a host/RG 602 joins or leaves a solicited node address (e.g., FF02::1:FFXX:XXXX) using MLD. In such a case, the IPv6 destination may be FF02::16 and the Multicast Address field may be FF02::1:FFXX:XXXX (solicited node) in the Multicast Listener Report message. The Dispatcher 606 may route the message to the MLD Proxy 610 (as indicated by the dashed line) because it has a destination address FF02::16. The Dispatcher 606 may do so even though the MLD message is destined for the BNG 614, e.g. because it is used for interface initialization in Neighbor Discovery as described in RFC 4861. As such, the solicited node messages may be forwarded to the BNG 614 transparently (i.e. the hop count of the message should not be altered), unlike other MLD messages that are terminated by the MLD proxy 610.

Figure 7:
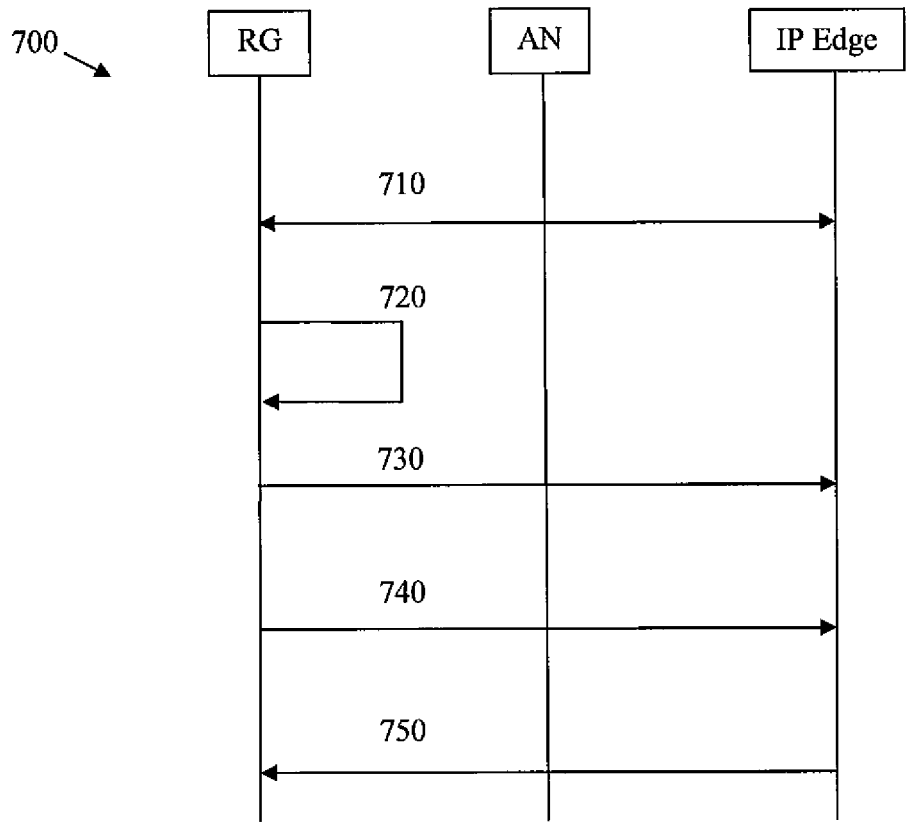
FIG. 7 is a protocol diagram of an embodiment of a RG address configuration method.

FIG. 7 illustrates an embodiment of a RG address configuration method 700, which may be used to configure the RG upstream interface address. Accordingly, the RG may behave as a host for the IP edge and a default router for any host, such as a UE, connected to the RG (not shown in the figure). In the RG address configuration method 700, the RG may establish authentication with the IP edge using an authentication exchange 710, for instance based on IEEE 802.1X, DHCP, protocol for carrying authentication for network access (PANA), or combinations thereof. Next, the RG may establish an upstream interface initiation 720. As such, the RG may obtain its link-local address, for instance by combining a well known prefix, e.g., FE80::/10, with an interface identifier, e.g., EUI-64. When the RG interface is enabled, the RG may transmit a multicast listen discovery (MLD) signal 730 to the IP edge to join the all-nodes multicast address on the interface and its corresponding solicited-node multicast address. The RG may also verify its address uniqueness by sending a DAD neighbor discovery (NS) signal 740 to the IP edge. The RG may receive a router advertisement (RA) message 750 from the IP edge that indicates the address configuration method. If the IP edge indicates a stateless address configuration the prefix formation options may be included in the RA 750. The RG may already have a local-link address and hence may not need to obtain a global IPv6 address. The IP edge may reclaim the advertised but unused prefixes, for instance after receiving a delegated prefix configuration request from the RG as described in RFC 3633.

Figure 8:
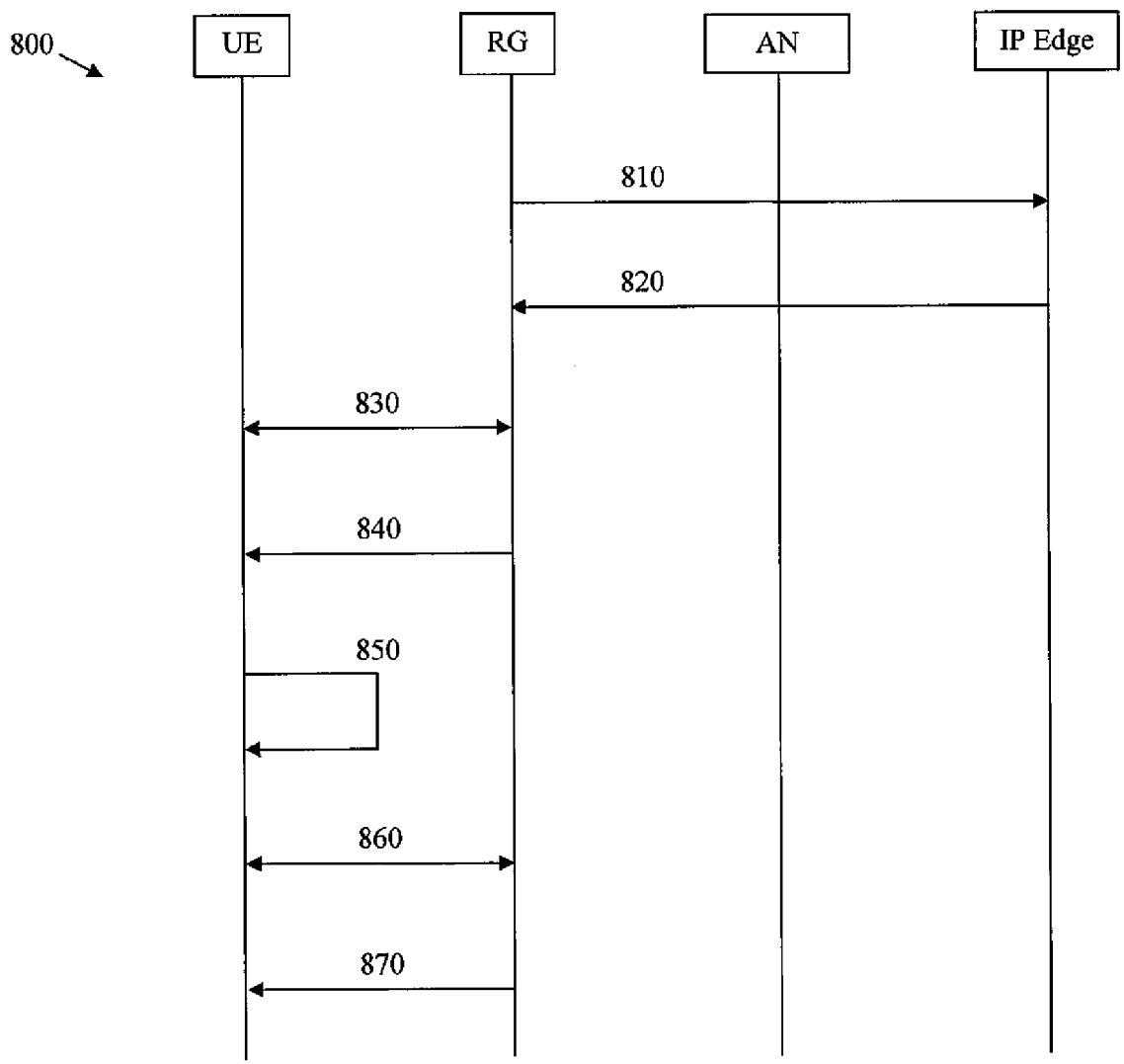
FIG. 8 is a protocol diagram of an embodiment of a user equipment (UE) address configuration.

FIG. 8 illustrates an embodiment of a UE address configuration method 800, which may be used to allocate a prefix to a trusted UE connected to a routed RG. When the UE is connected to a trusted port at the RG, the RG may behave as a router in charge of allocating a prefix to the UE. For instance, the prefix may be obtained using the DHCP as described by RFC 3633. The prefix may be obtained using stateless autoconfiguration and advertised to the UE or using stateful address configuration based on the DHCP as described by RFC 3315. The UE may discover the address configuration method in the router advertisement sent by the RG. Hence, the UE may derive its interface identity (IID) if required and perform neighbor discovery.

Specifically, in a stateless autoconfiguration, the RG may send a DHCP message 810 to the IP edge to request a prefix and prefix options for configuration parameters, e.g., domain name system (DNS), NTP, session initiation protocol (SIP), etc. The prefix may be equal to about 64 bits in the case of a shared link for the UE. Alternatively, the prefix may be equal to about 56 or about 48 bits in the case of a point-to-point link for the UE. The RG may then receive a DHCP reply 820 from the IP edge comprising the prefix and the configuration information. Hence, the RG may establish a link local address configuration 830 with the UE to configure the UE's local address, for instance as described in RFC 4862. The RG may also send a RA message 840 to the UE to indicate a stateless configuration option. Using the prefix information in the RA 840, a stateless address configuration procedure 850 may be established at the UE to obtain its IID, such as a EUI-64. The RG may receive a DAD NS 860 from the UE that comprises the derived address. The RG may then establish a DHCP configuration procedure 870 with the UE to provide the UE with configuration information.

Figure 9:
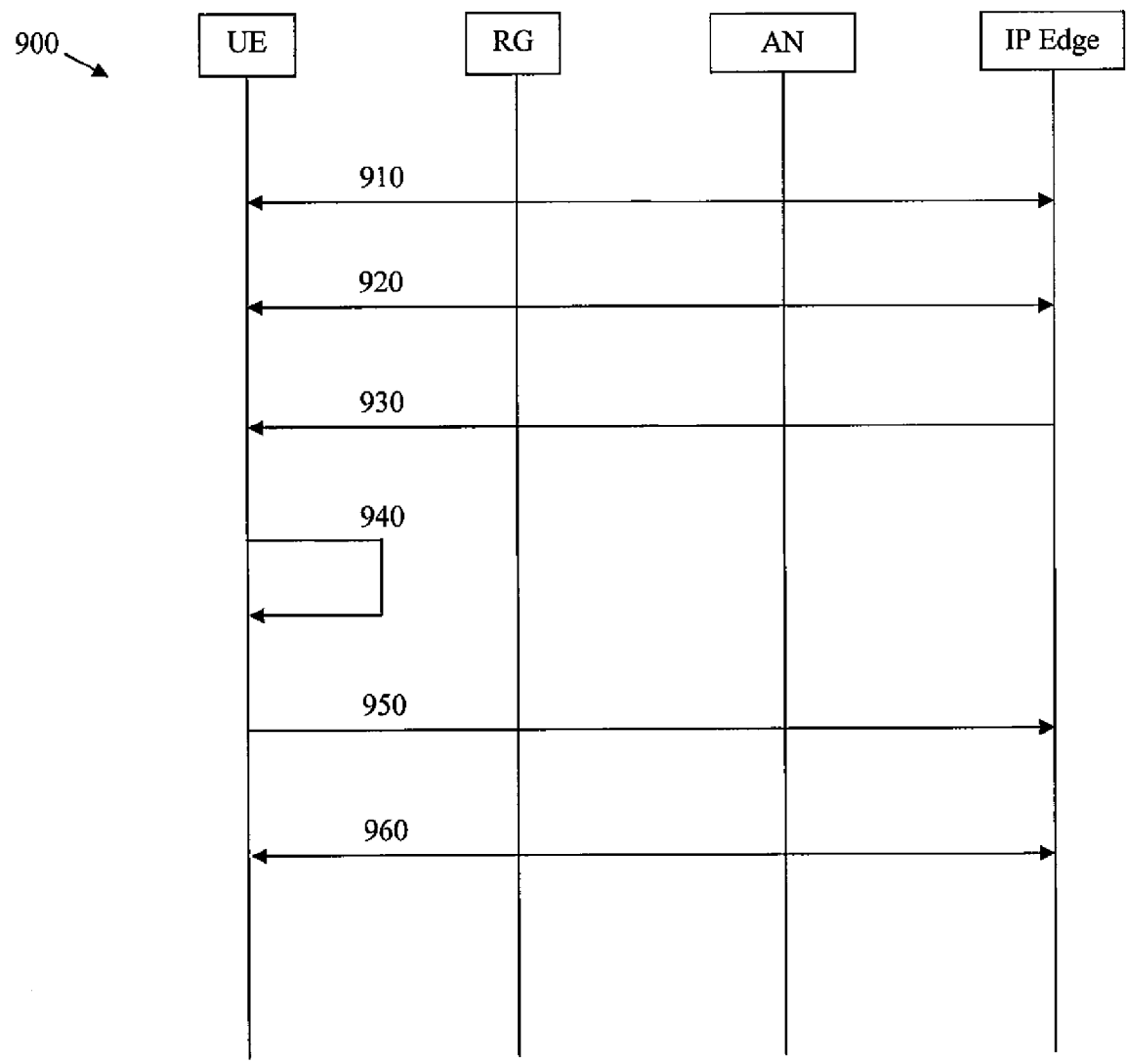
FIG. 9 is a protocol diagram of another embodiment of a UE address configuration.

FIG. 9 illustrates an embodiment of a UE address configuration method 900, which may be used to allocate a prefix to a UE connected to a bridged RG or AN. When the UE is connected directly to an AN or via a RG to the AN, the IP edge may be in charge of allocating the UE's prefix. Accordingly, both the AN and the RG may act as bridges between the UE and the IP edge. As such, the UE may not be trusted before its authentication is established. In this case, the UE may complete its authentication, and then obtain a prefix or address from the network. The IP edge may send a router advertisement that indicates a stateless or stateful address configuration.

Specifically, the UE may establish authentication with the IP edge using an authentication exchange 910, for instance based on IEEE 802.1X, DHCP, PANA, or combinations thereof. Next, the UE may establish a link local address configuration 920 with the IP edge, for instance as described in RFC 4862. As such, the UE may join the all-nodes multicast address on the interface and its corresponding solicited-node multicast address. The UE may receive a RA message 930 from the IP edge indicating a stateless configuration option. Using the prefix information in the RA 930, a stateless address configuration procedure 940 may be established at the UE to obtain its IID, such as a EUI-64. The UE may then send a DAD NS 950 to the IP edge UE that comprises the derived address and establish a DHCP configuration procedure 960 with the IP edge to provide the UE with configuration information.

In an embodiment, the RA, such as the RA 930 or the RA 840 discussed above, may be transmitted at different RA frequencies based on the access technology used in the network, such as different wired or wireless technologies. In some wireless networks, the RA frequency may be decreased in comparison to RFC 4861, for instance to reduce the wake up time of the UE and hence save battery power. According to RFC 4861, the RA may comprise a maximum transmission unit (MTU) option, which may indicate a MTU value that is different from the minimum size specified by RFC 2460 for "Internet Protocol, Version 6 (IPv6) Specification," by S. Deering et al., which is incorporated herein by reference as if reproduced in its entirety. For example the minimum size may be equal to about 1,500 bytes. A different MTU value may be required where there may be restrictions on the supported packets sizes, for example over a VLAN between the UE and the IP edge. For example, adding VLAN tags to the packets may increase the length of the packet by about four bytes for each VLAN tag, which may cause the packets to be discarded. Therefore, the size of the VLAN tags and the MTU should be predetermined over the VLANs. For instance, the MTU may be determined using a path MTU discovery based on RFC 1981 entitled "Path MTU Discovery for IP version 6," by J. McCann et al., which is incorporated herein by reference as if reproduced in its entirety. In an embodiment, the UE or RG may send a router solicitation (RS) message to solicit a RA from the IP edge, acquire neighbor discovery information, and complete L2 link establishment, for instance as described in RFC 4861. The RS message may also be sent at any time over an established IPv6 link.

In an embodiment, the IP edge or AN may maintain a filtering state comprising a plurality of filters to block or limit the packet flow to the UE or RG, for instance until the UE or RG is authenticated. Upon successful authentication, an IPv6 link may be established and may be bound to a network access control policy. Accordingly, the IPv6 link and its transport connection may be identified by an IPv6 prefix or address, service VLAN (S-VLAN) identifier, customer VLAN (C-VLAN) identifier, MAC address, physical layer identity (e.g., connection ID or port ID), or combinations thereof. The IP edge may implement the network access control policy in a manner similar to a standard router.

To implement the network access control policy at the AN, the AN may associate the host MAC address, such as the UE's or RG's MAC address, with the IPv6 prefix and the default router, e.g. the IP edge. For instance, the AN may implement a plurality of filters to ensure the transport of packets from an authenticated host to the default router. Specifically, the AN may not block packets with link-local addresses and allow such packets to bypass the filters of the filtering state. The AN may maintain an authenticated host list and at least a plurality of prefix/default router lists, which may be described in detail below.

In an embodiment, the filtering state may be maintained at the IP edge. Accordingly, the IP edge may obtain the IPv6 prefix or address, S-VLAN, C-VLAN, MAC address, or combinations thereof, which may be associated with the IPv6 link. The IP edge may store such information in an authorized prefix list, which may be used to filter upstream packets from the host. Additionally, the IP edge may be an access router that comprises default filters for downstream traffic. For example, the authorized prefix list may comprise the IPv6 prefix, the prefix length, the MAC address, and the VLAN address for each IPv6 link. Specifically, when a router advertisement for a prefix is sent to an authenticated host, the IP edge may store the advertised IPv6 prefix, the prefix length, the MAC address, and the VLAN address in the authorized prefix list. The IP edge may obtain such information from a request message, which may trigger a router advertisement, e.g., a router solicitation from the host or a host MAC from the authentication sequence.

Alternatively, the IP edge may snoop the DHCP exchange when stateful autoconfiguration is used with the host to obtain the IPv6 prefix and/or address, for instance as described in RFC 3315. The IPv6 prefix may then be stored in the authorized prefix list. In an embodiment, the IPv6 prefix may have a size equal to about 128 bits. Additionally, the IP edge may obtain and store the MAC address and VLAN address from the DHCP options, which may comprise line and/or interface identifier information about the host. When, the prefix is delegated to the host based on RFC 3633, the IP edge may act as a delegating router. As such, the IP edge may terminate a DHCP delegation request and store the delegated prefix and its length in the authorized prefix list. In an embodiment, the IP edge may delete or purge an entry in the authorized prefix list when a change in the authorization state occurs and the associated IP prefix lease expires.

In an embodiment, the IP edge may filter and forward the packets from the host upstream using the filtering state based on a plurality of rules. For instance, the packets forwarded from host that are not matched with entries in the authorized prefix list may be discarded or blocked, except for the authentication protocol frames that are used to authenticate the hosts. Additionally, when the source MAC and/or VLAN address of an incoming packet is found in an entry in the authorized prefix list, the packet may be forwarded if the source IP prefix and length also matches that entry. Alternatively, when the IP prefix of the incoming packet is found in an entry in the authorized prefix list, the packet may be forwarded if the source MAC and/or VLAN address also matches that entry.

In an embodiment, the filtering state may be maintained at the AN by snooping. Accordingly, the AN may snoop the authentication information exchanged between the host (UE or RG) and the IP edge to determine if the authentication was successful. The AN may store the MAC address of the authenticated host in the authenticated host list. The AN may also snoop the RA message information to obtain the default routers and their advertised prefixes for the host. The AN may then store this information in the prefix/default router list and link this information to the authenticated host list. When a host sends a neighbor solicitation to validate a tentative global address, the AN may verify whether the host MAC address is stored in the authenticated host list. As such, the AN may update the IPv6 prefix in the prefix/default router list with the global address prefix or the entire global address that corresponds to the host. In an embodiment, the prefix of the global address may have a length equal to about 128 bits.

Further, the AN may snoop the DHCP exchange between the host and the IP edge to discover the IPv6 address for the hosts that are configured using stateful address autoconfiguration, for instance as described in RFC 3315. This prefix may be stored in the prefix/default router list and may have a length equal to about 128 bits. The prefix may also be linked to the corresponding host in the authenticated host list. The AN may also snoop the DHCP messages to discover the IPv6 prefix assigned to a routed RG, for instance as described in RFC 3633. The prefix may then be stored in the prefix/default router list and linked to the routed RG entry in the authenticated host list. In an embodiment, the AN may update the filtering state when the host authentication status or information changes, the IP lease expires, or the IP lease is renewed.

In an alternative embodiment, the filtering state may be obtained via explicit notification. Accordingly, the AN may receive the filtering state information from the IP edge after authenticating the host and establishing a link with the host. For instance, after successfully authenticating the host, the IP edge may notify the AN with the MAC address of the host and the authentication status, e.g., successful authentication. Additionally, after establishing an IPv6 link using stateless or stateful address autoconfiguration, the IP edge may notify the AN with the MAC address of the host, the IPv6 prefix information, and the default router information, e.g., the IP edge information. Further, when a change occurs in the authentication status or information, the IP edge may notify the AN with that change, and the AN may update the filtering state accordingly.

In an embodiment, the AN may filter and forward the packets from the host upstream using the filtering state based on a plurality of rules. For instance, the packets forwarded from host that are not found in the authenticated host list may be discarded or blocked, except for the authentication protocol frames that are used to authenticate the hosts. Additionally, when the host MAC address of an incoming packet is found in the authenticated host list, the packet may be forwarded if the destination MAC address of the incoming packet matches the host's default router MAC address in the prefix/default router list and the corresponding IPv6 prefix matches the leftmost bits of the source IPv6 address in the incoming packets. Specifically, the leftmost bits of the source IPv6 address in the incoming packets may have a length equal to the length of the IPv6 prefix in the prefix/default router list. The AN may also comprise an MLD version two (MLDv2) proxy, which may be configured to forward the solicited node Multicast Listener Report frames to the IP edge. The MLDv2 proxy may also handle forwarding other multicast frames.

In an embodiment, the AN may be connected to a host via a L2 link and may be configured based on RFC 3810 for "Multicast Listener Discovery Version 2 (MLDv2) for IPv6," by R. Vida, Ed., which is incorporated herein by reference as if reproduced in its entirety. When a multicast capable interface at the host becomes enabled, the host may join the all-nodes multicast address on that interface, as well as the solicited node multicast address corresponding to each of the IP addresses assigned to the interface. The AN may be the node closest to the host, which may handle multicast access control and replication. Specifically, the AN may behave as an MLDv2 proxy and transparently forward solicited node Multicast Listener Report packets to the BNG and terminate MLD signaling for global multicast packets. The AN may transparently forward the link-local multicast packets to the IP edge, e.g., without processing the contents of the packets. Such packets may be used to send neighbor discovery messages and may be processed at the JP edge.

Further, the AN may maintain a multicast authorization list for each host that is authenticated. Accordingly, when a host is authenticated, the AN may add the MAC address of the host to the multicast authorization list. The IP edge may send the authorization profile for the host to the AN. The AN may also add the authorization profile information to the multicast authorization list at an entry corresponding to the host's MAC address, which may then be used for handling the packets at the AN. The authorization list may also comprise authorized multicast group addresses.

In an embodiment, the AN may handle the multicast packets based on a plurality of rules. For instance, the neighborhood discovery protocol multicast messages may be forwarded between the host and the IP edge without blocking. A MLD message may also be forwarded to the IP edge transparently if the MLD Multicast Listener Report message is related to a solicited node multicast address. However, all the remaining multicast related messages, such as MLD for global multicast group messages, may be terminated or otherwise handled by the MLD proxy at the AN.

Figure 10:
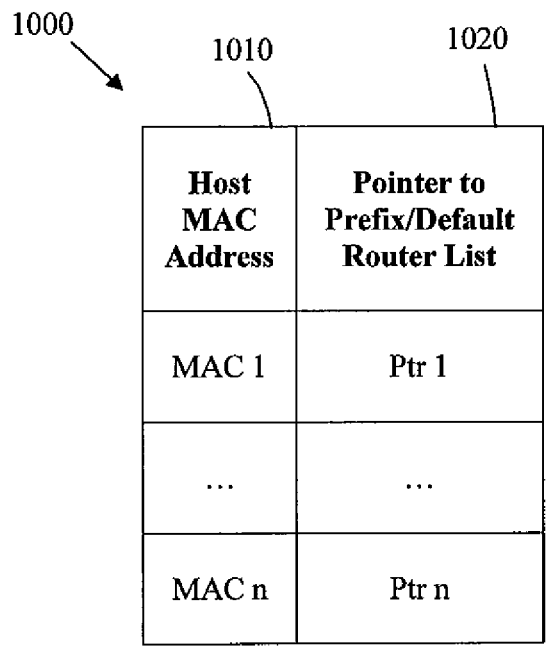
FIG. 10 is a schematic diagram of an embodiment of an authenticated host list.

FIG. 10 illustrates an embodiment of an authenticated host list 1000, which may be used to associate the host MAC addresses with an IPv6 prefixes and a default routers, for instance at the AN. Specifically, each host MAC address in the authenticated host list 1000 may be associated with a plurality of IPv6 prefixes and default routers. Additionally, the quantity of IPv6 prefixes and a default routers associated with each host MAC address may be different. For instance, the authenticated host list 1000 may be stored at the AN in the form of a table, which may comprise a host MAC address column 1010 and pointer to prefix/default router list column 1020. The host MAC address column 1010 may comprise the MAC addresses assigned to each UE or RG connected to the AN, or to both. The pointer to prefix/default router list column 1020 may comprise a list of pointers that point to the location of the prefix and default router information associated with each host MAC address. For example, each pointer may specify a memory address at the AN or that may be access by the AN, which may comprise a prefix/default router list for each host MAC address.

Figure 11:
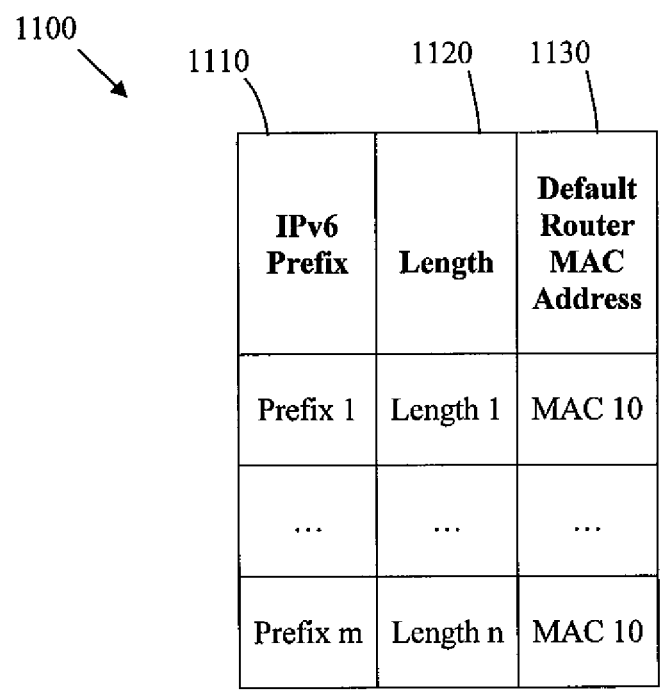
FIG. 11 is a schematic diagram of an embodiment of a prefix/default router list.

FIG. 11 illustrates an embodiment of a prefix/default router list 1100, which may comprise the prefix and default router information associated with a host MAC address, for instance in the authenticated host list 1000. Specifically, the prefix/default router list 1100 may be associated with one of the host MAC addresses for one host connected to the AN. The prefix/default router list 1100 may be stored at the AN in the form of a table, which may comprise an IPv6 prefix column 1110, a length column 1120, and a default router MAC address column 1130. The IPv6 prefix column 1110 may comprise a plurality of prefixes assigned to the host with the corresponding host MAC address, the length column 1120 may comprise the length for each assigned prefix, and the default router MAC address column 1130 may comprise the MAC addresses of the default routers that assigned the prefixes. For example, the default router MAC address column 1130 may comprise a list of IP edges that assigned a list of prefixes to the same host.

Figure 12:
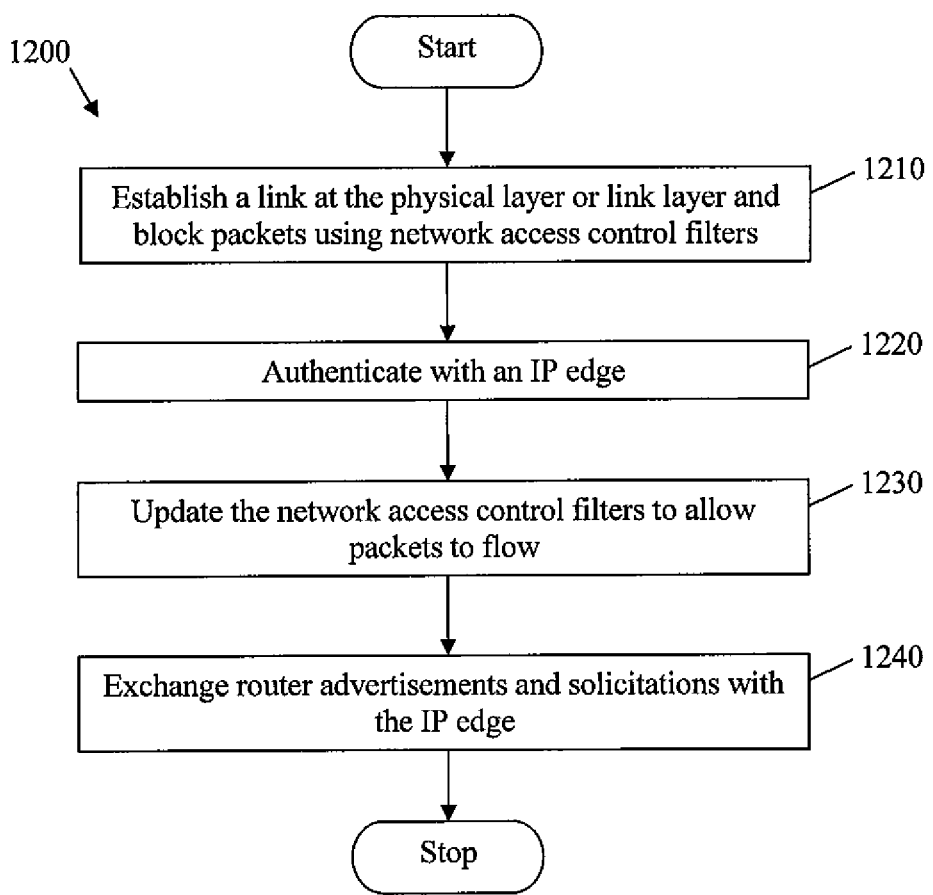
FIG. 12 is a schematic diagram of an embodiment of an IPv6 link establishment method.

FIG. 12 illustrates an embodiment of an IPv6 link establishment method 1200, which may be used to establish an IPv6 link, for instance in the shared IPv6 prefix link model 400 or the point-to-point IPv6 prefix link model 500. The IPv6 link establishment method 1200 may start at block 1210, where a basic link may be established at a UE or RG with an AN. For instance, the basic link may be established at the physical layer or at the link layer, such as a DSL link, a FTTH link, an Ethernet link, or an IEEE 802.11 link. Further, when the basic link is established, the packets may be blocked, for instance using network access control filters at the AN. In some embodiments, the basic link may be established at the UE with the RG instead of the AN, for instance when the RG terminates a L2 link of the UE. At block 1220, the UE or RG may be authenticated with an IP edge, for instance via the connections with the AN. For instance, a routed RG may be authenticated with the IP edge to allow a trusted UE connected to the routed RG access to a provider network via the IP edge. At block 1230, the network access control filters may be updated at the AN after authenticating the UE or the RG to allow the flow of packets. In some embodiments, the authentication results may be snooped at the AN from the IP edge. At block 1240, router advertisements and solicitations may be exchanged at the UE or RG with the IP edge to complete establishing the IPv6 link, for instance based on RFC 4861.

Figure 13:
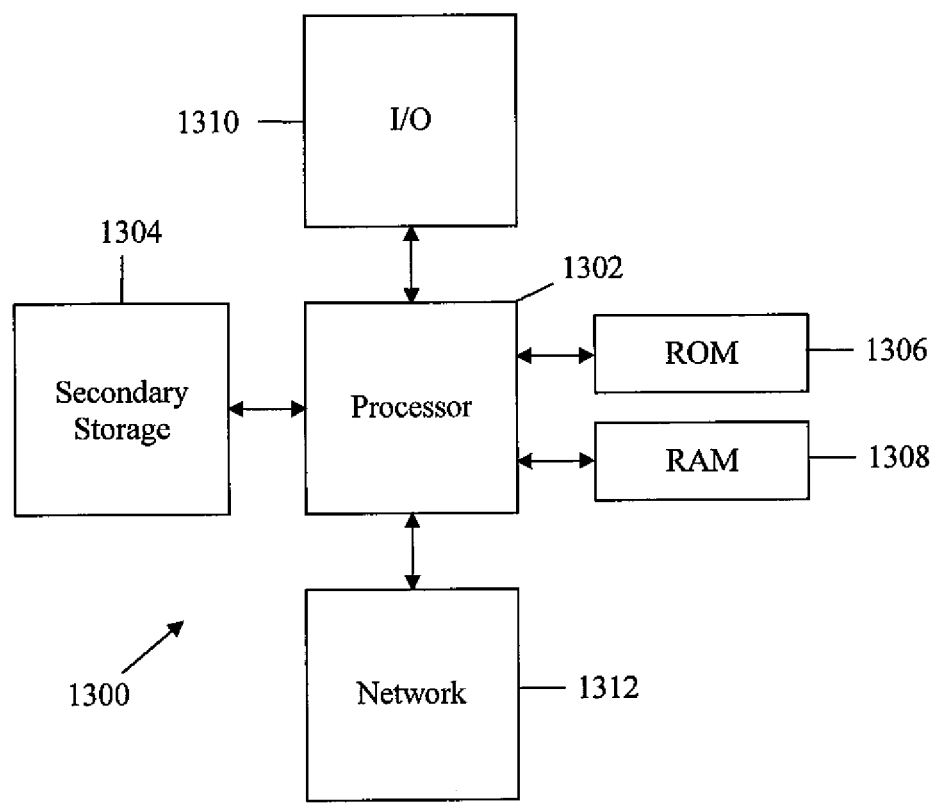
FIG. 13 is a schematic diagram of an embodiment of a general-purpose computer system.

The network components described above may be implemented on any general-purpose network component, such as a computer or network component with sufficient processing power, memory resources, and network throughput capability to handle the necessary workload placed upon it. FIG. 13 illustrates a typical, general-purpose network component 1300 suitable for implementing one or more embodiments of the components disclosed herein. The network component 1300 includes a processor 1302 (which may be referred to as a central processor unit or CPU) that is in communication with memory devices including secondary storage 1304, read only memory (ROM) 1306, random access memory (RAM) 1308, input/output (I/O) devices 1310, and network connectivity devices 1312. The processor 1302 may be implemented as one or more CPU chips, or may be part of one or more application specific integrated circuits (ASICs).

The secondary storage 1304 is typically comprised of one or more disk drives or tape drives and is used for non-volatile storage of data and as an over-flow data storage device if RAM 1308 is not large enough to hold all working data. Secondary storage 1304 may be used to store programs that are loaded into RAM 1308 when such programs are selected for execution. The ROM 1306 is used to store instructions and perhaps data that are read during program execution. ROM 1306 is a non-volatile memory device that typically has a small memory capacity relative to the larger memory capacity of secondary storage 1304. The RAM 1308 is used to store volatile data and perhaps to store instructions. Access to both ROM 1306 and RAM 1308 is typically faster than to secondary storage 1304.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An access node (AN) configured to:
  receive an authentication success message associated with a device having a Media Access Control (MAC) address, wherein the device is a residential gateway (RG), wherein the authentication success message is received from an Internet Protocol (IP) edge in a broadband network, and wherein the authentication success message comprises an authentication information that indicates a successful authentication of the device by the IP edge;
  snoop the authentication success message to verify the successful authentication of the device by the IP edge;
  proxy the device by forwarding a dynamic host configuration protocol (DHCP) prefix request message to the IP edge for IP prefix delegation;
  receive and snoop a DHCP reply message to determine an Internet Protocol version 6 (IPv6) prefix assigned to the device, wherein the DHCP reply message is responsive to the DHCP prefix request message;
  forward the DHCP reply message to the device, wherein the DHCP reply message comprises an Identity Association for Prefix Delegation (IA_PD) Prefix option comprising the IPv6 prefix and a length of the IPv6 prefix, and wherein the AN received the DHCP reply message from the IP edge prior to forwarding the DHCP reply message to the device;
  receive from the device a packet comprising a source MAC address and a source IPv6 address;
  drop the packet when the MAC address is equal to the source MAC address and the leftmost bits of the source IPv6 address defined by the length are not equal to the IPv6 prefix; and
  maintain a filtering state at the AN, wherein the filtering state comprises an association between the IPv6 prefix and the MAC address.

2. The AN of claim 1, wherein the MAC address is translated from the device's real MAC address.

3. The AN of claim 1, wherein the IPv6 prefix allows a host connected to the RG to configure the host's IPv6 address.

4. The AN of claim 1, wherein the MAC address is associated with a plurality of IPv6 prefixes in a prefix/default router list, and wherein none of the plurality of IPv6 prefixes are equal to the leftmost bits of the source IPv6 address defined by the length.

5. The AN of claim 1, wherein the source MAC address is derived from a 64-bit extended unique identifier (EUI-64) that is comprised in the source IPv6 address.

6. The AN of claim 1, wherein the authentication success message is an Extensible Authentication Protocol (EAP) success message that is forwarded to the device by the AN subsequent to snooping of the authentication success message.

7. The AN of claim 1, wherein the authentication success message comprises: the MAC address of the device, an authentication status that indicates a successful authentication, and a second MAC address corresponding to the IP edge, and
  wherein, responsive to receiving the authentication success message, the AN is further configured to:
  populate an authentication host list with a first entry corresponding to the MAC address of the device; and
  populate a prefix/default router list with a second entry,
  wherein the first entry comprises a first pointer that is associated with the second entry, and
  wherein the second entry comprises a row consisting of the IPv6 prefix, the length, and the second MAC address.

8. The AN of claim 7 further configured to:
  receive an authentication status message from the IP edge device indicating a change to the authentication status of the device; and
  update the authentication host list, the prefix/default router list, or both to reflect the change to the authentication status of the device,
  wherein the change to the authentication status of the device comprises a revocation of the device's authentication, and
  wherein updating the authentication host list, the prefix/default router list, or both to reflect the change to the authentication status of the device comprises deleting the first entry from the authentication host list and the second entry from the prefix/default router list.

9. A computer program product for use by an access node (AN), the computer program product comprising computer executable instructions stored on a non-transitory computer readable medium such that when executed by a processor cause the AN to:
  receive an authentication success message associated with a device having a Media Access Control (MAC) address, wherein the device is a residential gateway (RG), wherein the authentication success message is received from an Internet Protocol (IP) edge in a broadband network, and wherein the authentication success message comprises an authentication information that indicates a successful authentication of the device by the IP edge;

snoop the authentication success message to verify the successful authentication of the device by the IP edge;

proxy the device by forwarding a dynamic host configuration protocol (DHCP) prefix request message to the IP edge for IP prefix delegation;

receive and snoop a DHCP reply message to determine an Internet Protocol version 6 (IPv6) prefix assigned to the device, wherein the DHCP reply message is responsive to the DHCP prefix request message;

forward the DHCP reply message to the device, wherein the DHCP reply message comprises an Identity Association for Prefix Delegation (IA_PD) Prefix option comprising the IPv6 prefix and a length of the IPv6 prefix, and wherein the AN received the DHCP reply message from the IP edge prior to forwarding the DHCP reply message to the device;

receive from the device a packet comprising a source MAC address and a source IPv6 address;

drop the packet when the MAC address is equal to the source MAC address and the leftmost bits of the source IPv6 address defined by the length are not equal to the IPv6 prefix; and maintain a filtering state at the AN, wherein the filtering state comprises an association between the IPv6 prefix and the MAC address.

10. The computer program product of claim 9, wherein the MAC address is translated from the device's real MAC address.

11. The computer program product of claim 9, wherein the IPv6 prefix allows a host connected to the RG to configure the host's IPv6 address.

12. The computer program product of claim 9, wherein the MAC address is associated with a plurality of IPv6 prefixes in a prefix/default router list, and wherein none of the plurality of IPv6 prefixes are equal to the leftmost bits of the source IPv6 address defined by the length.

13. The computer program product of claim 9, wherein the source MAC address is derived from a 64-bit extended unique identifier (EUI-64) that is comprised in the source IPv6 address.

14. The computer program product of claim 9, wherein the authentication success message is an Extensible Authentication Protocol (EAP) success message that is forwarded to the device by the AN subsequent to snooping of the authentication success message.

15. The computer program product of claim 9, wherein the authentication success message comprises: the MAC address of the device, an authentication status that indicates a successful authentication, and a second MAC address corresponding to the IP edge, and wherein, responsive to receiving the authentication success message, the AN is further configured to:

populate an authentication host list with a first entry corresponding to the MAC address of the device; and populate a prefix/default router list with a second entry, wherein the first entry comprises a first pointer that is associated with the second entry, and wherein the second entry comprises a row consisting of the IPv6 prefix, the length, and the second MAC address.

16. The computer program product of claim 15, wherein the instructions further cause the AN to:

receive an authentication status message from the IP edge device indicating a change to the authentication status of the device; and update the authentication host list, the prefix/default router list, or both to reflect the change to the authentication status of the device, wherein the change to the authentication status of the device comprises a revocation of the device's authentication, and wherein updating the authentication host list, the prefix/default router list, or both to reflect the change to the authentication status of the device comprises deleting the first entry from the authentication host list and the second entry from the prefix/default router list.

* * * * *